United States Patent
Bressan et al.

(10) Patent No.: US 10,723,854 B2
(45) Date of Patent: Jul. 28, 2020

(54) FORMULATION OF POLYMERIC MIXTURES FOR THE PRODUCTION OF CROSS-LINKED EXPANDED PVC FOAMS AND PROCESS FOR PRODUCING SAID FOAMS

(71) Applicant: DIAB INTERNATIONAL AB, Laholm (SE)

(72) Inventors: Raffaela Bressan, Oderzo (IT); Fabiano Nart, Sedico (IT); Marco Renon, Agordo (IT); Ulf Torgerssen, Laholm (SE)

( * ) Notice: Subject to any disclaimer, the term of this patent is extended or adjusted under 35 U.S.C. 154(b) by 125 days.

(21) Appl. No.: 15/765,257

(22) PCT Filed: Oct. 27, 2016

(86) PCT No.: PCT/EP2016/075921
§ 371 (c)(1),
(2) Date: Mar. 31, 2018

(87) PCT Pub. No.: WO2017/084852
PCT Pub. Date: May 26, 2017

(65) Prior Publication Data
US 2018/0273716 A1 Sep. 27, 2018

(30) Foreign Application Priority Data
Nov. 16, 2015 (IT) .................. 102015000072928

(51) Int. Cl.
*C08J 9/00* (2006.01)
*C08J 9/02* (2006.01)
*C08J 9/08* (2006.01)

(52) U.S. Cl.
CPC ........... *C08J 9/0061* (2013.01); *C08J 9/0066* (2013.01); *C08J 9/02* (2013.01); *C08J 9/08* (2013.01); *C08J 2201/026* (2013.01); *C08J 2203/02* (2013.01); *C08J 2205/052* (2013.01); *C08J 2300/208* (2013.01); *C08J 2327/06* (2013.01); *C08J 2479/08* (2013.01)

(58) Field of Classification Search
CPC . C08J 9/0061; C08J 9/0066; C08J 9/02; C08J 9/08; C08J 2201/026; C08J 2203/02; C08J 2205/052; C08J 2300/208; C08J 2327/06; C08J 2479/08
See application file for complete search history.

(56) References Cited

U.S. PATENT DOCUMENTS

| 6,538,050 B1* | 3/2003 | Weilandt .................. C08J 9/125 523/219 |
| 2007/0200266 A1 | 8/2007 | Elser |
| 2010/0068487 A1 | 3/2010 | Lauri |
| 2010/0294982 A1* | 11/2010 | Schiller .................. C08J 9/0066 252/75 |
| 2015/0166752 A1* | 6/2015 | Scholz .................. C08J 9/0023 521/79 |

FOREIGN PATENT DOCUMENTS

| WO | 2014106867 | 7/2014 |
| WO | 2015088431 | 6/2015 |

* cited by examiner

*Primary Examiner* — Irina S Zemel
(74) *Attorney, Agent, or Firm* — Themis Law

(57) ABSTRACT

A formulation of polymeric mixtures for the production of cross-linked expanded PVC foams, of the type comprising PVC, isocyanates, anhydrides and one or more nucleating agents, wherein the nucleating agents are composed of nucleating materials having a porosity of 1-100 nm, preferably 2-50 nm. With respect to known formulations for the production of cross-linked PVC foams, a formulation according to the invention offers the advantage of obtaining the desired degrees of stabilization, nucleation and expansion, even without the use of diazocompounds.

9 Claims, 6 Drawing Sheets

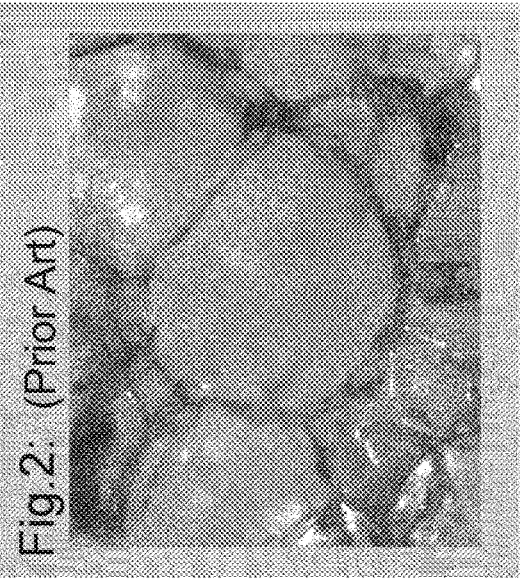
Fig. 2: (Prior Art)
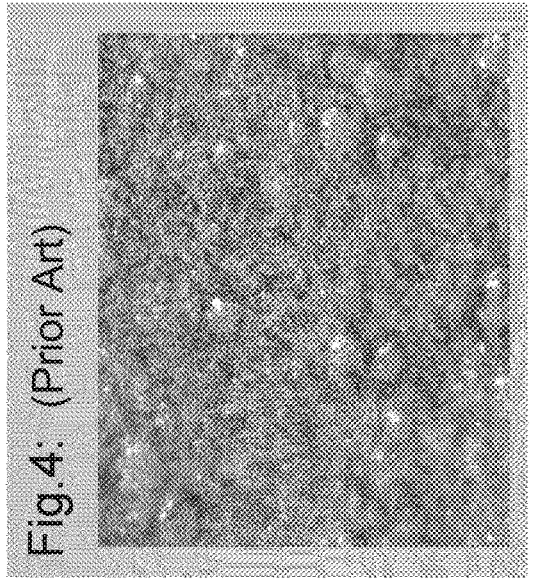
Fig. 4: (Prior Art)
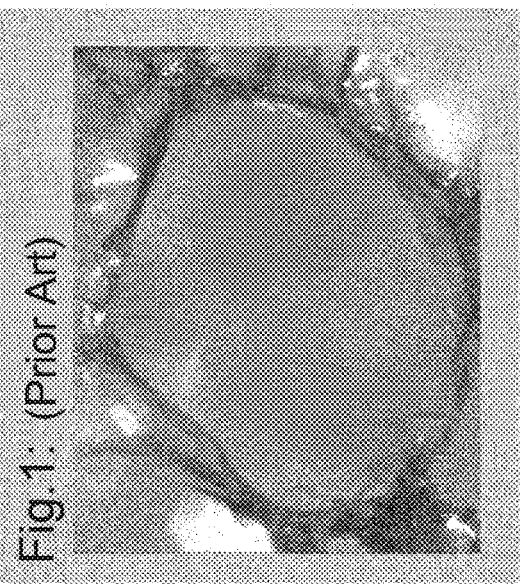
Fig. 1: (Prior Art)
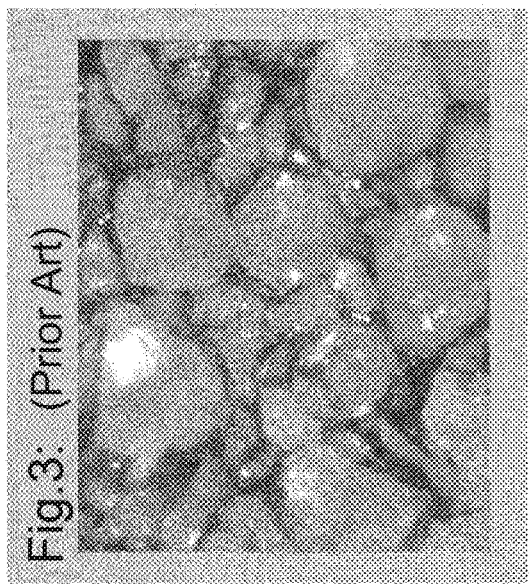
Fig. 3: (Prior Art)

FORMULATION OF POLYMERIC MIXTURES FOR THE PRODUCTION OF CROSS-LINKED EXPANDED PVC FOAMS AND PROCESS FOR PRODUCING SAID FOAMS

The present invention relates to a formulation of polymeric mixtures for the production of cross-linked expanded PVC foams. The same invention is also extended to the process used for producing said cross-linked expanded PVC foam.

The field of the invention relates to that of cross-linked expanded PVC foams used for the production of expanded materials such as PVC panels and the like, adopted as a core in the field of composite materials.

Cross-linked expanded PVC foams are traditionally prepared starting from a mixture comprising PVC, isocyanates with a cross-linking function, anhydrides destined for reacting with water and isocyanate for the formation of amides during the expansion and cross-linking phase, an expanding agent based on diazocompounds for the formation of gas (azobisisobutyronitrile AZDN) and a nucleating and stabilizing agent, also based on diazo-compounds (azodicarbonamide ADC).

In particular, in the field of the production of cross-linked PVC foams, traditional ADC exerts a nucleating function, providing an expanded material having small closed cells (diameter of 0.4-0.6 mm), which serve for conferring a homogeneous structure to the expanded product, and with good mechanical properties. ADC also has a stabilizing function, inhibiting decomposition reactions of PVC during the moulding process of said mixture in a press.

The traditional mixtures described above, however, have the disadvantage of using diazo-compounds, such as ADC and AZDN, which are undesired as they are dangerous. ADC is in fact in the black list of REACH, as it is classified as being a Very High Concerned (VHC) substance. AZDN is, in turn, a material in powder form classified as being explosive and susceptible of releasing toxic substances.

US 2007/200266 A1 relates to a method for producing a cross-linked PVC foam body from a starting mixture containing PVC, an isocyanate or polyisocianate, an organic anhydride and a chemical expanding agent.

WO 2014/106867 A1 discloses a process for the production of rigid foamed objects, wherein organic diazocompounds are employed in the manufacturing of said objects.

The main objective of the present invention is to provide a formulation of a polymeric mixture for the production of expanded PVC foams which, unlike traditional formulations, allows the desired stabilization, nucleation and expansion degree to be obtained, even in the absence of azo-derivatives.

A further objective of the invention is to provide a process suitable for producing expanded PVC foams with the use of the above-mentioned formulation of a polymeric mixture.

These and other objectives are achieved with the formulation of a polymeric mixture, the cross-linked expanded PVC foams and the process described hereinafter.

With respect to known formulations for the production of cross-linked PVC foams, the formulation according to the invention offers the advantage of obtaining the desired stabilization, nucleation and expansion degree to be obtained, even in the absence of azo-derivatives.

Furthermore, with the use of anhydrides liquid at room temperature of the formulation of the invention, the advantage is obtained that, in the heating phase in the press, heat does not have to be provided for melting the traditional anhydrides in the solid state. In this way, the liquid anhydride and isocyanate are reacted, with the formation of the necessary quantities of $CO_2$ for the expansion of the PVC foam, without removing the heat from the reaction environment for melting the starting PVC.

The above reaction between anhydride and isocyanate advantageously allows a basic imide structure to be obtained, which, with the subsequent completion of the reactions, leads to a cross-linked structure which is formed around the PVC chains. In this way, a final structure is created, called "Inter Penetrating Network" (IPN), with the presence of a high imide structure, suitable for conferring higher thermal properties than the traditional properties, to the PVC foam.

It has also been surprisingly found that, with the use of zeolites and sodium bicarbonate in the quantities according to the invention (less than 3% by weight), alone or combined with each other, the HCl formed by thermal effect in the reaction environment, coming from the PVC and responsible for the degradation of the same polymer, is sequestered and neutralized by these substances, thus generating an expanded product which is thermally stabilized and free of degradation defects.

These and other objectives, advantages and characteristics appear evident from the following description of some preferred embodiments of the formulation and process of the invention, illustrated, for purely exemplificative and non-limiting purposes, in the figures of the enclosed drawings.

In these:

FIGS. 1 to 4 illustrate, by means of an optical microscope, the cellular structure of a cross-linked expanded PVC foam, according to the known art and according to three examples of the invention, respectively;

Figure 10:
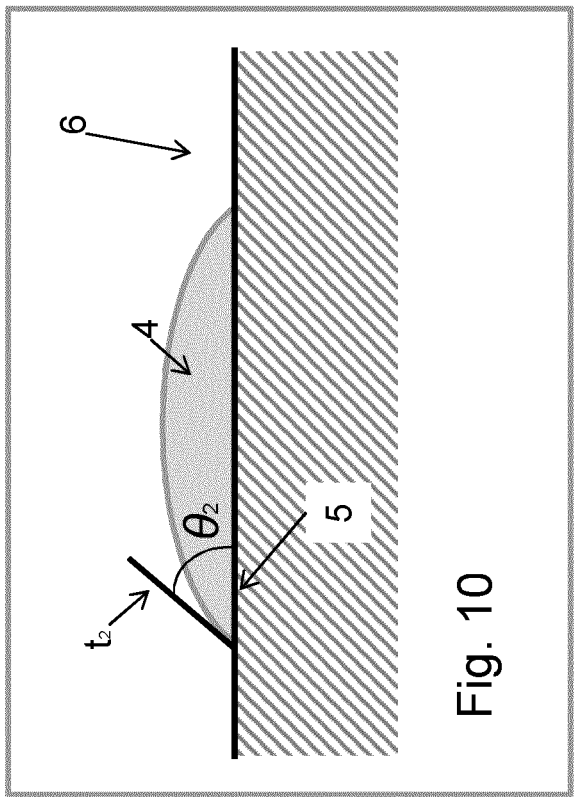
Figure 11:
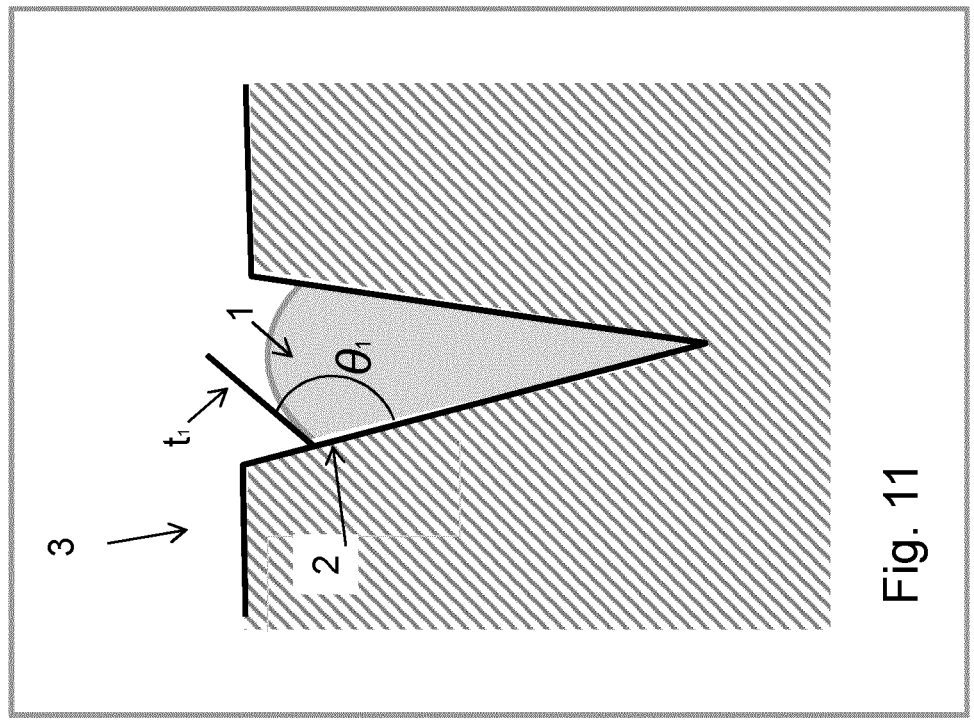

FIGS. 10 and 11 schematically illustrate a nucleation example of a nucleation agent with a non-porous surface and porous surface, respectively.

The polymeric mixture of the invention for the production of cross-linked expanded PVC foams has the objective of providing an expanded material without diazo-compounds, characterized by the presence of closed cells having a diameter smaller than or equal to 0.6 mm, i.e. sufficiently small to confer a homogeneous structure to the expanded product, having a low thermal conductivity, a reduced resin absorption and a higher glass transition temperature.

To enable the gas to generate a stable core, capable of forming closed cells having a small diameter, a certain energy threshold must be exceeded, which, for this reason, must be as low as possible. This energy threshold depends, in particular, on the critical radius of said core, which in turn depends on the interfacial tension between the gas bubbles and the polymeric mass. In the system of the polymeric mixture of the invention, which has become heterogeneous due to the presence of nucleating agents, the free energy $\Delta Get$ to be exceeded is expressed by the formula:

$$\Delta Get = \Delta Gom \cdot f(\partial) \quad 5$$

wherein:

$\Delta Get$=heterogeneous free energy, i.e. in the presence of nucleating agents $\Delta Gom$=homogeneous free energy, i.e. in the absence of nucleating agents $f(\partial) = \frac{1}{4}(2+\cos\partial)\cdot(1-\cos\partial)^2$ wherein $\partial$ is the wettability angle.

Furthermore, as $0<f(\partial)<1$, in order to obtain a low $\Delta Get$ value, $f(\partial)$ must approach zero, i.e. the angle $\partial$ must be high. For this reason, according to the invention, materials characterized by having a porous surface are used as nucleating agents for the production of cross-linked expanded PVC foams.

In this case, in fact, and as better illustrated in FIGS. 10 and 11, the angle $\partial 1$ formed between the tangent t1 at the surface of the gas bubble 1 and the corresponding wall 2 of the porous nucleation site 3, is greater than the angle $\partial 2$ formed between the tangent t2 at the surface of the gas bubble 4 and the corresponding wall 5 of the non-porous nucleation site 6.

Figure 5:
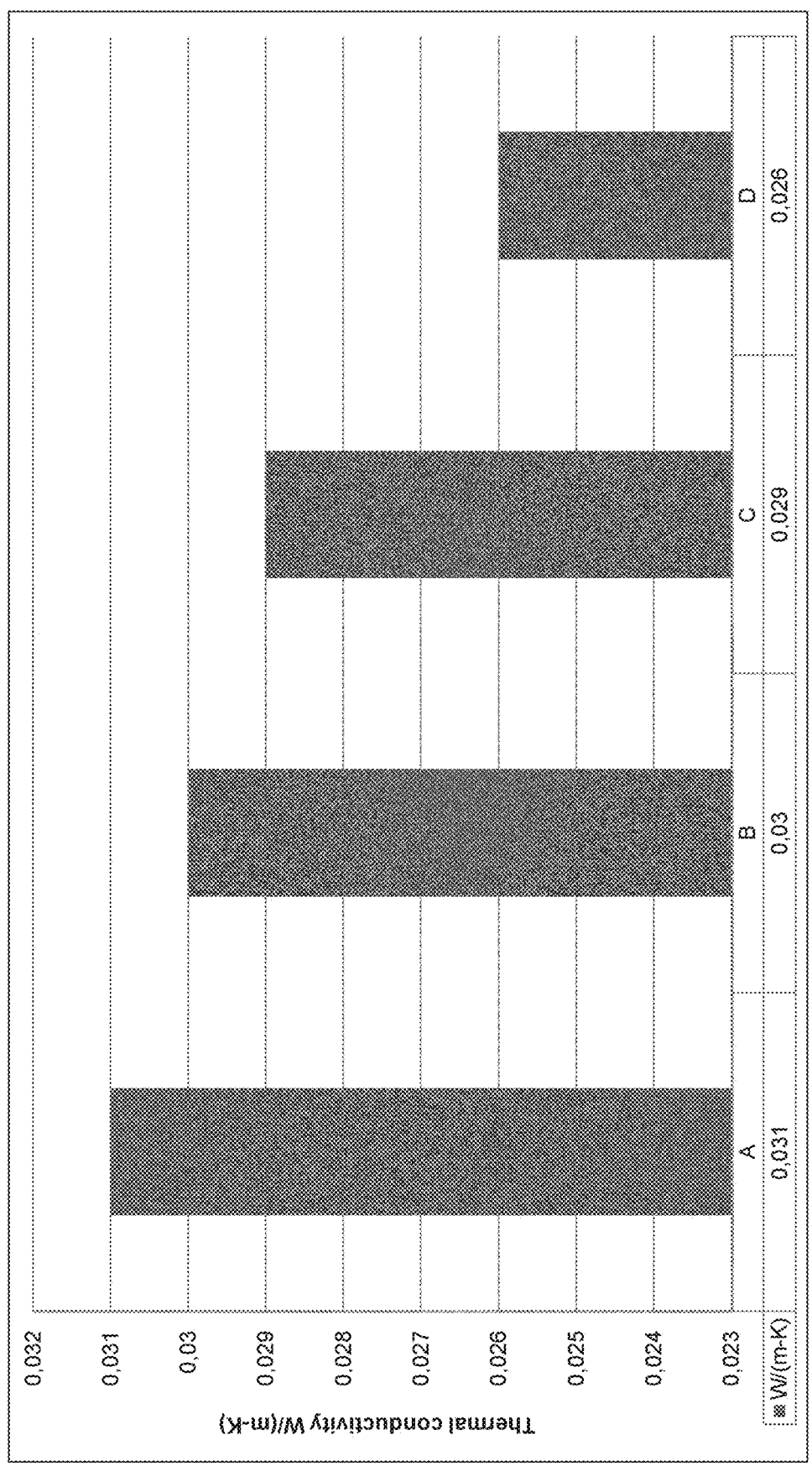
FIG. 5 illustrates the trend of the thermal conductivity values of the foams of the previous figures.
Figure 6:
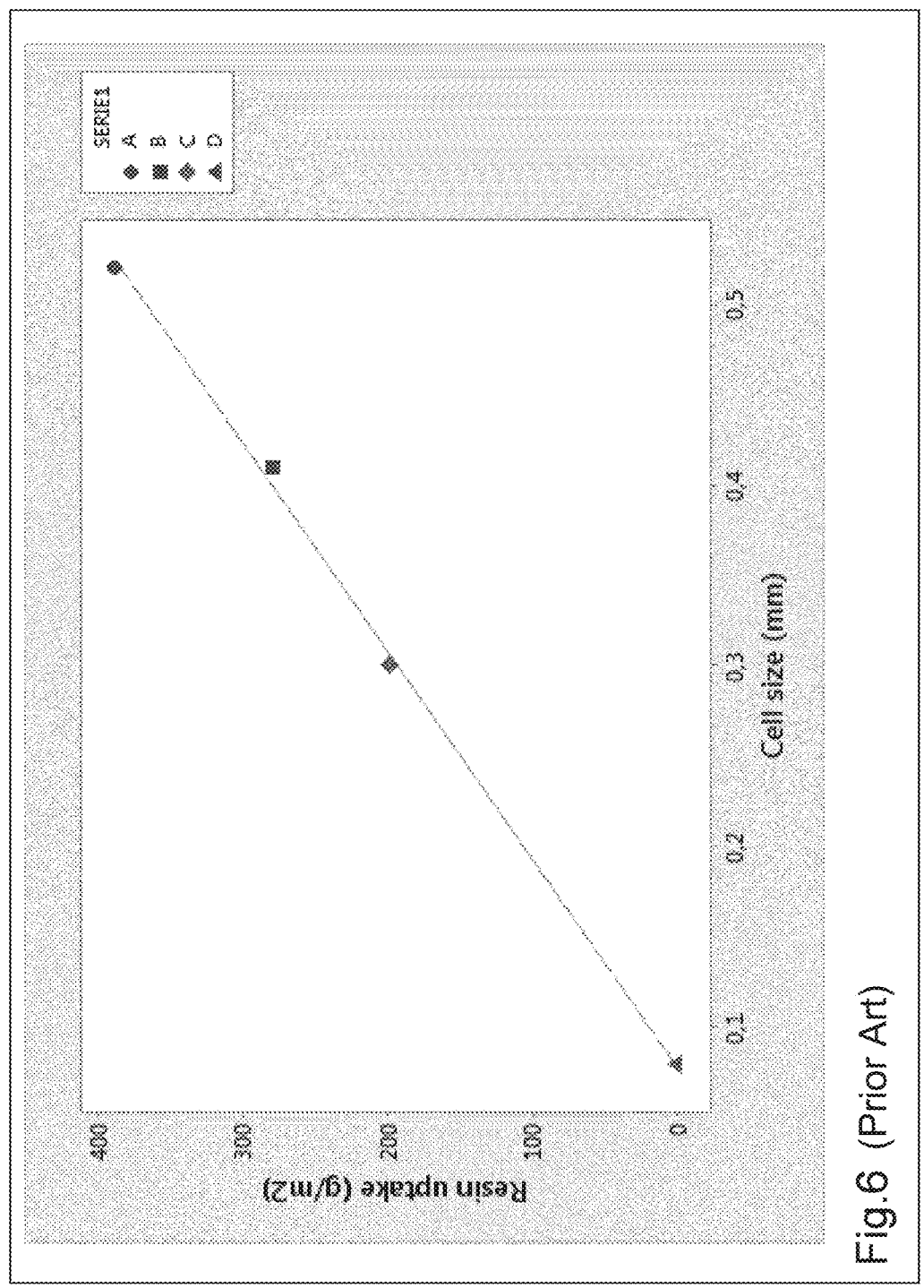
FIG. 6 illustrates the trend of the resin absorption values of the foams of FIGS. 1 to 4.
Figure 7:
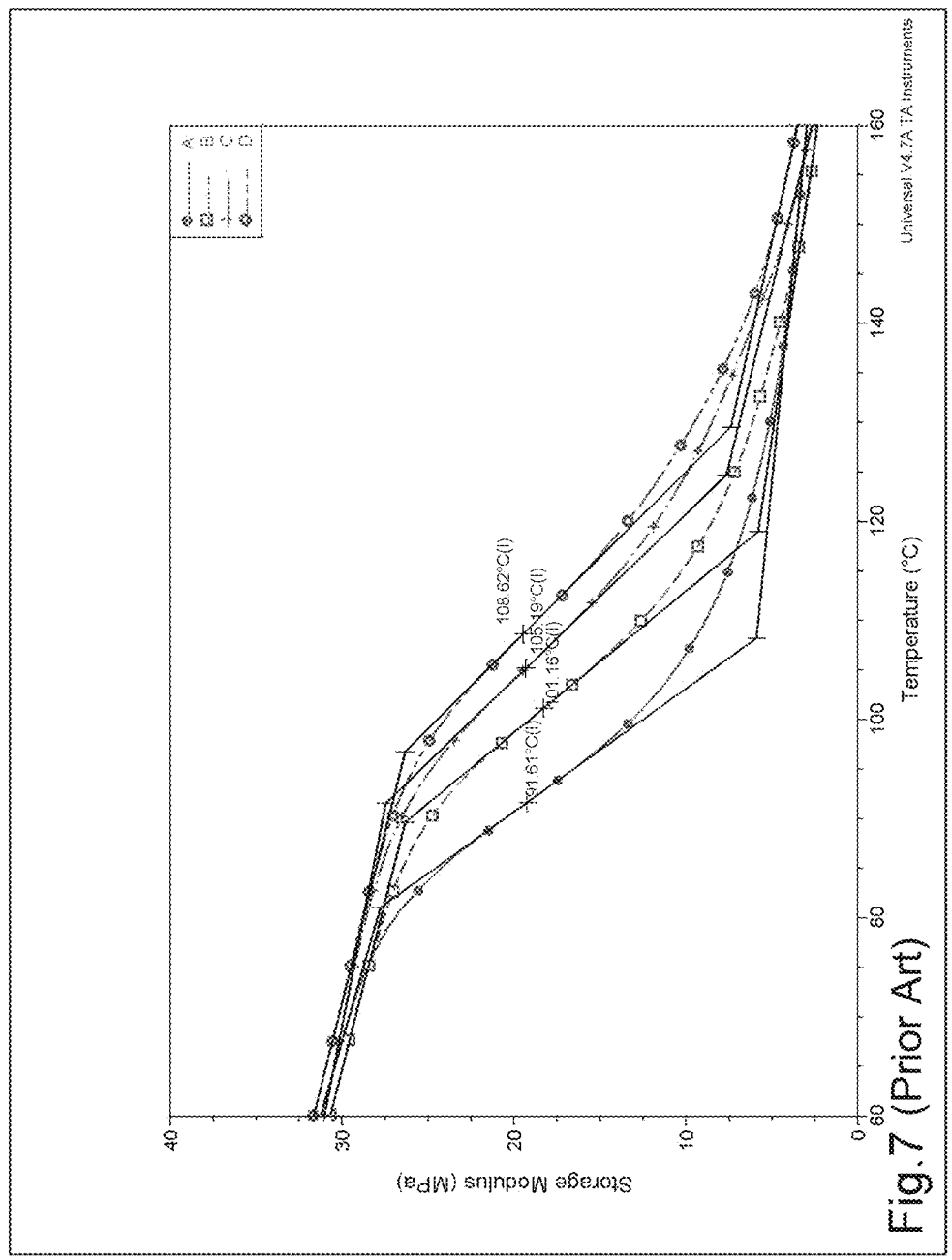
FIG. 7 illustrates the graph of the trend of the Storage Modulus in the Dynamic Mechanical Analysis (DMA) as a function of the temperature, in the foams of FIGS. 1 to 4.
Figure 8:
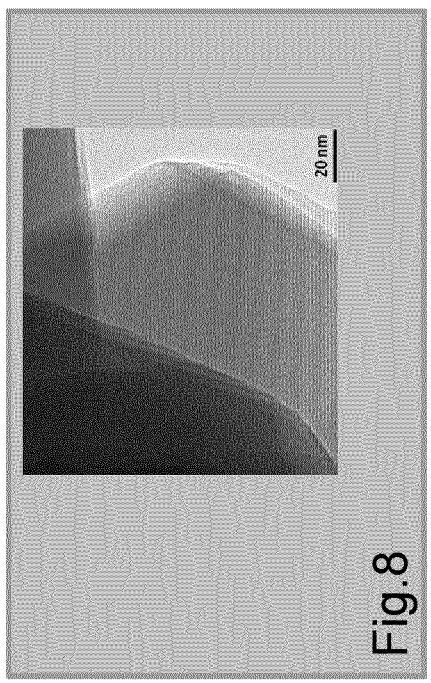
FIGS. 8 and 9 illustrate microscope magnifications of the porous structure, of a zeolite and sodium carbonate of the invention, respectively.
Figure 9:
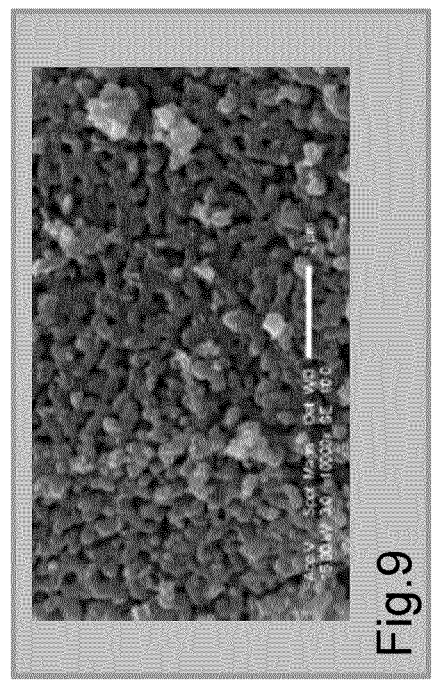

Nucleating agents suitable for the purposes of the invention are, for example, the zeolite of FIG. 8, with pores ranging from 2-50 nm, and the sodium bicarbonate of FIG. 9, with pores of about 100 nm. The porosity of the nucleating agent for the purposes of the invention is 1-100 nm, more preferably 2-50 nm. Furthermore, the desired porosity degree of the sodium bicarbonate is advantageously obtained, according to the invention, in the hot pressing phase of the formation process of cross-linked PVC foams.

According to the invention, the $CO_2$ gas phase is given by the following reaction between isocyanate and anhydride:

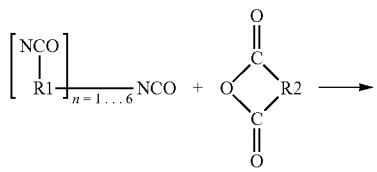

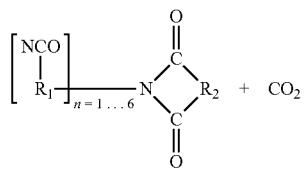

wherein

R1=C6H12; C9H18; C12H24; C10H18; C13H10; C6H4; C7H5; C10H6; C16H11; C7H6

R2=C6H6; C7H6; C6H8; C6H10; C14H26; C3H4; C3H6; C5H10; C10H18; C4H8; C7H10; C7H8; C4H402; C6H12; C7H12.

According to a preferred variant of the invention, the $CO_2$ gas phase is given by the following reaction between isocyanate and anhydride:

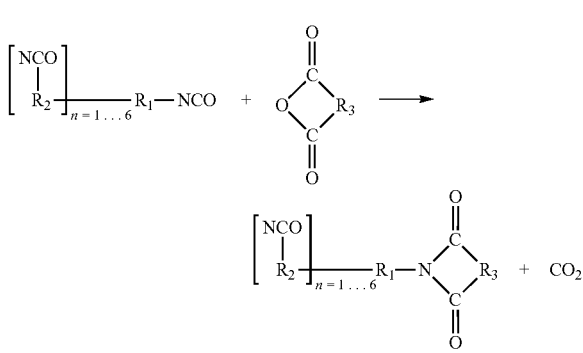

wherein:

R1=C6H4, C7H6

R2=C6H12; C9H18; C12H24; C10H18; C13H10; C6H4; C7H5; C10H6; C16H11; C7H6;

R3=C6H6; C7H6; C6H8; C6H10; C14H26; C3H4; C3H6; C5H10; C10H18; C4H8; C7H10; C7H8; C4H402; C6H12; C7H12.

As can be observed, in these reactions, use is no longer made of the traditional diazo-compounds, with the function of expanding agents for the production of $N_2$.

The zeolites suitable for the invention are of the aluminosilicate type:

$$xMO.ySiO_2.zAl_2O_3$$

wherein:

x=0-0.5 y=0-0.5 z=0.5-1

M=Na, K, Ca, $NH_4$, Fe.

Furthermore, whereas the zeolites act exclusively as stabilizing and nucleating agents, the sodium bicarbonate of the invention also adds the effect of contributing to the cell expansion, producing $CO_2$ through the following reaction with hydrochloric acid coming from PVC:

$$NaHCO_3 + HCl \rightarrow NaCl + CO_2 + H_2O$$

In order to not subtract heat from the PVC melting process, the quantities of bicarbonate used are advantageously and preferably lower than 3% by weight. Furthermore, again with the same objective, the anhydrides used are those that are in the liquid state at room temperature, in particular anhydrides having formula:

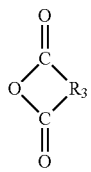

wherein

R3=C6H6; C7H6; C6H8; C6H10; C14H26; C3H4; C3H6; C5H10; C10H18; C4H8; C7H10; C7H8; C4H402; C6H12; C7H12.

In this way, it is no longer necessary to have heat that serves for melting the traditional solid anhydrides. In addition, the use of the liquid anhydrides of the invention introduces imide structures into the reaction environment, necessary for the formation of an IPN-Inter Penetrating Network, having better thermal properties.

The following formulations containing, by weight:

| PVC | 30-60% |
|---|---|
| Isocyanate | 20-60% |
| Liquid anhydrides | 3-40% | said formulations further comprising:

| Zeolites | less than 3% |
|---|---|
| Sodium bicarbonate | less than 3% | are preferred for the invention.

In the table, the following formulations are compared:
A formulations of the known art, in which diazo-derivatives are used, with both a nucleating and stabilizing function (ADC), and also with the function of blowing agent (AZDN) (FIG. 1);
B formulation of the invention, with sodium bicarbonate alone (FIG. 2);
C formulation of the invention, with sodium bicarbonate and zeolite (FIG. 3);
D formulation of the invention, with zeolite alone (FIG. 4).

The foams obtained with these formulations were tested with respect to thermal conductivity, which must be as low as possible, the resin absorption quantity, which must also have minimum values, and the glass transition temperature, preferably high. The results of these tests are indicated in the following table, in which the quantities of compounds in the mixture are expressed as weight percentages:

|  | A | B | C | D |
|---|---|---|---|---|
| PVC | 40 | 40 | 40 | 40 |
| Isocyanate | 51 | 51 | 51 | 51 |
| Anhydride | Phthalic (solid) 5 | Hexahydro-phthalic (liquid) 8 | Hexahydro-phthalic (liquid) 8 | Hexahydro-phthalic (liquid) 8 |
| ADC | 0.5 | / | / | / |
| AZDN | 3.5 | / | / | / |
| Zeolite | / | / | 0.5 | 3 |
| Sodium-bicarbonate | / | 2 | 2 | / |
| Cell diameter (mm) | 0.52 | 0.41 | 0.3 | 0.08 |
| Thermal conductivity (W/m · ° K) | 0.031 | 0.03 | 0.029 | 0.026 |
| Resinabsorption (g/m²) | 389 | 280 | 199 | 0 |
| Glass transition temperature Tg(° C.) | 91 | 101 | 105 | 109 |

From this table, it can be observed that the cross-linked expanded PVC foams have closed cells with a diameter smaller than or equal to 0.6 mm, i.e. sufficiently small to confer a homogeneous structure to the expanded product, with a thermal conductivity lower than 0.030 W/m° K, a resin absorption lower than 300 g/m2 and a glass transition temperature higher than 100° C.

The surface of the cross-linked expanded PVC foams of the previous table has the appearance illustrated in FIGS. 1 to 4, in which a decrease in the cell diameter in the foams of the invention, can be observed. The best results are obtained with formulation D of FIG. 4, which comprises high quantities of zeolite.

In the process of the invention, the polymeric mixture is prepared by first introducing the liquid components (isocyanate and anhydride) into the mixer, followed by the powders of porous stabilizing and nucleating agents, and finally PVC. The mixing is effected under vacuum for stripping the air and the mixture thus obtained is poured into moulds which are heated under pressure in a press (80-180 bar) to a temperature of 160-180° C. for the time necessary for melting the PVC and for the isocyanate-anhydride cross-linking reactions and formation of the gas phase. It is during this hot compression that the sodium bicarbonate possibly present acquires the porous structure of the invention.

The material obtained from the hot pressing, in which the cross-linking reactions between isocyanate and anhydride have partially taken place, and with the formation of imide and $CO_2$, is then subjected to the expansion and cross-linking process in the presence of water vapour, at temperatures of 80-99° C. and 45-70° C., respectively. In this phase, the water reacts with the remaining isocyanate and anhydride reagents, thus completing the cross-linking reactions and producing additional quantities of $CO_2$. The cross-linked expanded PVC foams of the invention (known as "Inter Penetrating Network"-IPN) are thus obtained, whose properties in terms of thermal conductivity, resin absorption and glass transition temperature, with the same cell diameter, are higher with respect to the foams of the known art.

The invention claimed is:

1. A method of producing a cross-linked expanded PVC foam, comprising:
    providing a polymeric mixture comprising an isocyanate, an anhydride, a stabilizing and nucleating agent having a porous surface, and PVC (polyvinyl chloride), wherein the anhydride is liquid at room temperature, and wherein the polymeric mixture contains no diazo-compounds;
    mixing the polymeric mixture under vacuum, so as to strip air from the polymeric mixture;
    immediately after the mixing, pouring the polymeric mixture into a mold;
    heating the mold in a press at a temperature of 160-180° C. and a pressure of 80-180 bars for a time sufficient for the PVC to melt, the isocyanate and the anhydride to begin cross-linking, and $CO_2$ to form;
    allowing the polymeric mixture to expand and the cross-linking to complete by exposing the polymeric mixture to a temperature between 45 and 99° C. in presence of water vapor.

2. The method according to claim 1, wherein the cross-linking is a reaction consisting of:

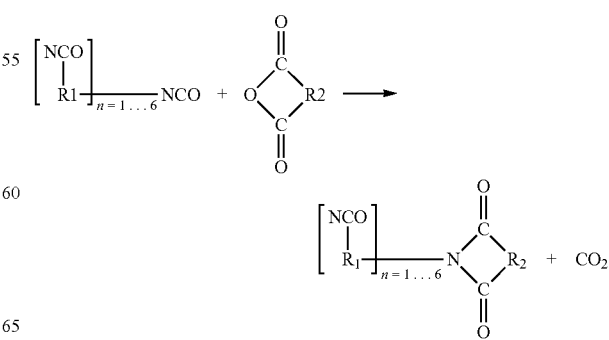

and wherein:

R1=$C_6H_{12}$; $C_9H_{18}$; $C_{12}H_{24}$; $C_{10}H_{18}$; $C_{13}H_{10}$; $C_6H_4$; $C_7H_5$; $C_{10}H_6$; $C_{16}H_{11}$; or $C_7H_6$; and R2=$C_6H_6$; $C_7H_6$; $C_6H_8$; $C_6H_{10}$; $C_{14}H_{26}$; $C_3H_4$; $C_3H_6$; $C_5H_{10}$; $C_{10}H_{18}$; $C_4H_8$; $C_7H_{10}$; $C_7H_8$; $C_4H_4O_2$; $C_6H_{12}$; or $C_7H_{12}$.

3. The method according to claim 1,
wherein the cross-linking is a reaction consisting of:

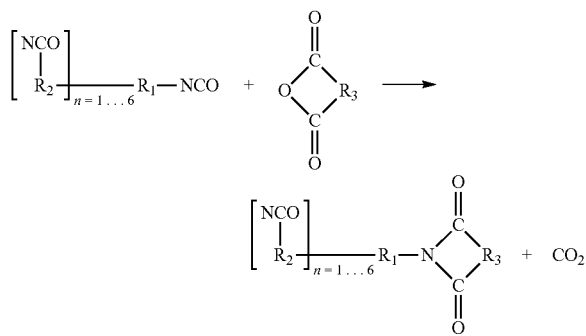

and wherein:

R1=$C_6H_4$, or $C_7H_6$;

R2=$C_6H_{12}$; $C_9H_{18}$; $C_{12}H_{24}$; $C_{10}H_{18}$; $C_{13}H_{10}$; $C_6H_4$; $C_7H_5$; $C_{10}H_6$; $C_{16}H_{11}$; or $C_7H_6$; and R3=$C_6H_6$; $C_7H_6$; $C_6H_8$; $C_6H_{10}$; $C_{14}H_{26}$; $C_3H_4$; $C_3H_6$; $C_5H_{10}$; $C_{10}H_{18}$; $C_4H_8$; $C_7H_{10}$; $C_7H_8$; $C_4H_4O_2$; $C_6H_{12}$; or $C_7H_{12}$.

4. The method according to claim 1, wherein the porous surface has pores with a size of 1-100 nm.

5. The method according to claim 1, wherein the nucleating agent is a porous zeolite, composed of an aluminosilicate having a formulation:

$x\text{MO}.y\text{SiO}_2.z\text{Al}_2\text{O}_3$ wherein:
x=0-0.5;
y=0-0.5;
z=0.5-1; and
M=Na, K, Ca, $NH_4$, Fe.

6. The method according to claim 5, wherein the porous zeolite is less than 3% by weight of the polymeric mixture.

7. The method according to claim 6, wherein the polymeric mixture further comprises sodium bicarbonate in quantity of less than 3% by weight.

8. The method according to claim 1, wherein exposing the polymeric mixture to a temperature between 45 and 99° C. comprises exposing the polymeric mixture to temperatures of 80-99° C. and 45-70° C.

9. The method according to claim 1, wherein allowing the polymeric mixture to expand and the cross-linking to complete comprises causing the cross-linking to form a cross-linked structure around chains of the PVC and create an interpenetrating polymer network.

* * * * *